United States Patent
Himmel

[15] 3,648,177
[45] Mar. 7, 1972

[54] TRANSMITTER FOR DISTANCE-MEASURING SYSTEM

[72] Inventor: Leon Himmel, Upper Montclair, N.J.

[73] Assignee: International Telephone and Telegraph Corporation, Nutley, N.J.

[22] Filed: May 26, 1969

[21] Appl. No.: 827,751

[52] U.S. Cl. ........................... 325/141, 325/30, 325/145, 325/163, 343/13 R, 343/17.2 R
[51] Int. Cl. ........................................................ G01s 7/28
[58] Field of Search ............... 343/13, 17.2 R, 17.2; 325/30, 325/45, 47, 145, 147, 163, 141

[56] References Cited

UNITED STATES PATENTS 3,057,189  10/1962  Joy.................................343/17.2 X

Primary Examiner—Rodney D. Bennett, Jr.
Assistant Examiner—R. Kinberg
Attorney—C. Cornell Remsen, Jr., Walter J. Baum, Paul W. Hemminger, Percy R. Lantzy, Philip M. Bolton, Isidore Togut and Charles L. Johnson, Jr.

[57] ABSTRACT

In a distance-measuring system, the transmitter transmits a gaussian-pulse modulated signal wherein the phase of the carrier frequency is shifted for a predetermined interval of time within the transmitted gaussian pulses.

1 Claim, 3 Drawing Figures

INVENTOR
LEON HIMMEL
BY Philip M Bolton
ATTORNEY

TRANSMITTER FOR DISTANCE-MEASURING SYSTEM

BACKGROUND OF THE INVENTION

1. Field of the Invention

The present invention relates generally to distance-measuring equipment and more particularly to apparatus for detecting the arrival time of predetermined points or intervals of a modulation signal.

2. Description of Prior Art

Many existing systems, such as Tacan, used for measuring distance were designed to transmit rounded or gaussian shaped pulses in order to preserve the RF spectrum and to minimize adjacent channel interference. In order to determine the arrival time of the rounded or gaussian pulses for the measurement of distance, circuits responding to the half amplitude point of said pulses or peak detectors are utilized. Unfortunately, these schemes sacrifice accuracy because gaussian pulses do not have clearly defined edges or peaks.

SUMMARY OF THE INVENTION

It is an object of the present invention to provide an improved distance-measuring system wherein the arrival time of a rounded pulse may be more accurately determined.

According to the invention there is provided a navigation system comprising means for transmitting a pulse modulated signal having a carrier frequency which is angularly modulated, wherein said angular modulation identifies predetermined portion of said pulse modulated signal; and means responsive to said transmitted signal for extracting therefrom a modulating signal and a signal which identifies predetermined portions of said modulating signal.

BRIEF DESCRIPTION OF THE DRAWINGS

The above-mentioned and other objects of this invention will become apparent by reference to the following description in conjunction with the accompanying drawings, in which.

DESCRIPTION OF THE PREFERRED EMBODIMENT

In order to transmit pulses whose time of arrival may be accurately ascertained, the phase of the RF carrier of said pulses is shifted abruptly or the frequency of the RF carrier may be shifted by an appropriate phase shift for a predetermined interval of time depending upon the nature of the indication required by the receiving equipment.

Figure 1:
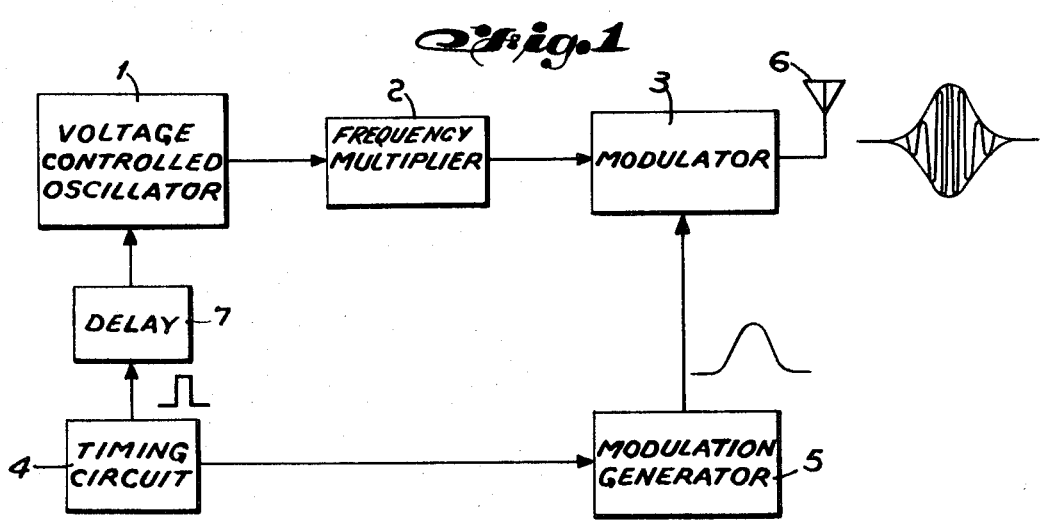
FIG. 1 illustrates a first transmitter according to the invention.

In a first embodiment of a transmitter, wherein a predetermined position within a pulse is to be used to indicate the arrival of said pulse, as shown in FIG. 1, a timing circuit 4 is coupled to a modulation generator 5 and provides thereto a narrow timing pulse which is used by said modulation generator 5 to initiate the generation of the desired output-modulating pulse. The output of said modulation generator 5 is coupled to modulator 3. Timing circuit 4 further provides said narrow timing pulse to delay circuit 7. Delay circuit 7 is coupled to a voltage-controlled oscillator 1 and provides thereto said timing pulse which is delayed by a predetermined amount of time. The delayed timing pulse is used to angularly modulate or more specifically to change the phase of the output signal of said voltage controlled oscillator 1 continuously for a period of time consistent with its duration. The output signal of voltage controlled oscillator 1 is coupled to the modulator 3 via frequency multiplier 2. The resulting output of modulator 3 is an RF pulse signal whose carrier frequency is momentarily shifted and whose envelope conforms to the desired modulation as determined by modulation generator 5. Modulator 3 is further coupled to an antenna 6 for the transmission of said RF signal.

Figure 3:
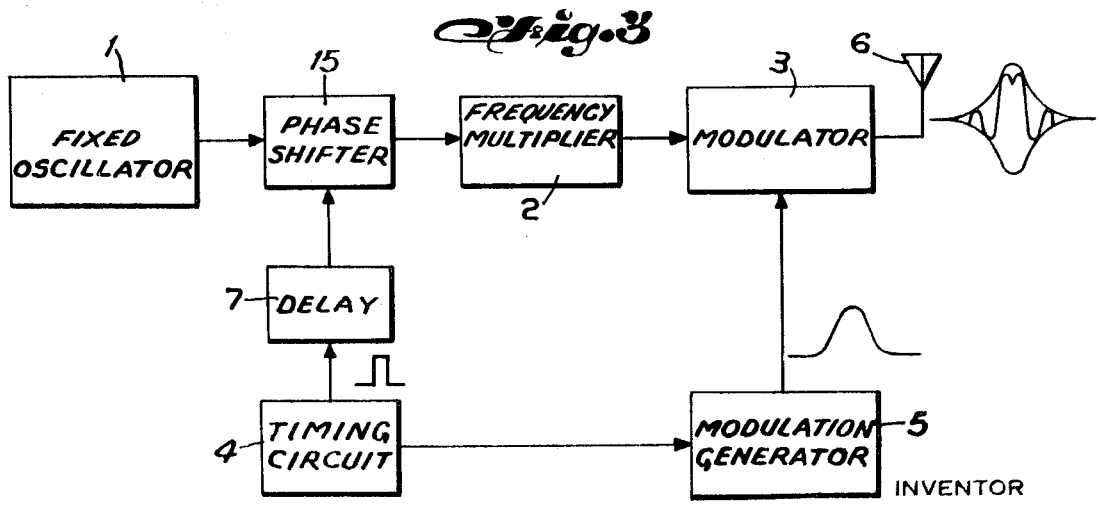
FIG. 3 illustrates a second transmitter according to the invention.

In a second embodiment of a transmitter, as shown in FIG. 3, a timing circuit 4 is coupled to a modulation generator 5 and provides thereto a narrow timing pulse which is used by modulation generator 5 to initiate the generation of the desired output modulating pulse. The output of said modulation generator 5 is coupled to modulator 3. Timing circuit 4 further provides said narrow timing pulse to delay circuit 7. Delay circuit 7 is connected to a phase shifter 15 and couples thereto a timing pulse which is delayed by a predetermined amount of time. Fixed oscillator 1 is coupled to multiplier 2 via said phase shifter 15. Said delayed timing pulse activates phase shifter 15. That is, during the time of said timing pulse, the signal output of said fixed oscillator 1 is phase shifted a predetermined amount. At all other times, the output of oscillator 1 passes through phase shifter 15 without being phase shifted. The output of said multiplier 2 is coupled to modulator 3 whose output is an RF pulse signal whose carrier frequency is phase shifted at a predetermined time and whose envelope conforms to the desired modulation as determined by modulation generator 5.

Figure 2:
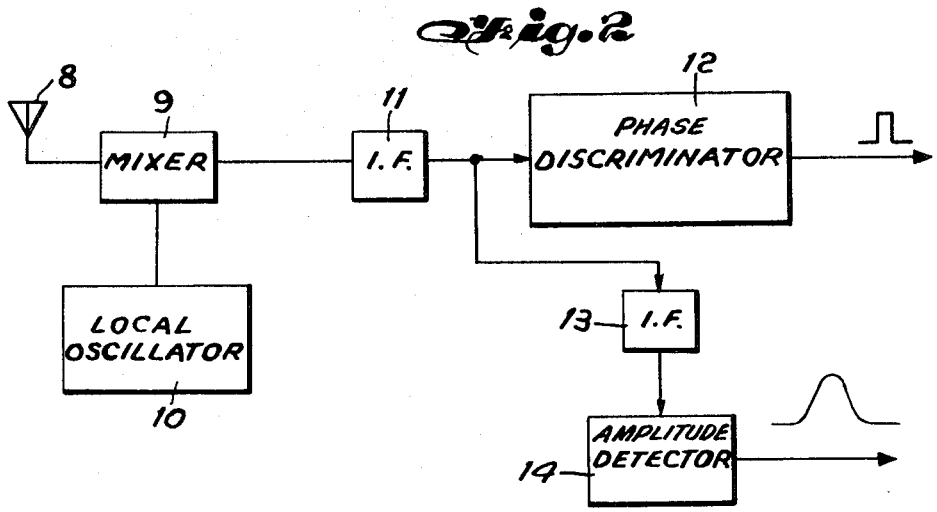
FIG. 2 illustrates a receiver according to the invention.

In an embodiment of a receiver, as shown in FIG. 2, an antenna 8 detects a transmitted RF signal and couples said signal to mixer 9, which is tuned by local oscillator 10 to the transmitter frequency band. The output of mixer 9 is amplified by an IF amplifier 11 whose bandwidth is sufficient to pass a spectrum of frequencies corresponding to the RF signal. IF amplifier 11 is coupled to a phase discriminator 12 having an output which provides a narrow pulse, due to the angular modulation, which because of the predetermined timing is useful for determining the arrival time of said RF pulse, and also coupled to an IF amplifier 13 whose bandwidth is sufficient to pass a spectrum of frequencies corresponding to the modulating pulse. The output of IF amplifier 13 is coupled to a amplitude detector 14 whose output corresponds to the modulating signal.

I claim:

1. Apparatus for transmitting a pulse modulated signal having a carrier frequency which is angularly modulated comprising:

a transmitting medium;

a modulator coupled to said transmitting medium;

a pulse modulation generator coupled to said modulator for providing thereto a pulse modulating signal;

an oscillator for providing an output signal;

a timing circuit coupled to said modulation generator for providing a timing pulse thereto which is used by said modulation generator to initiate the generation of a desired modulating output pulse;

a delay circuit coupled to said timing circuit for delaying said timing pulse; and a phase shifter coupled to said oscillator and said delay circuit for phase shifting the output of said oscillator during the time of said delayed timing pulse, the output of said phase shifter coupled to said modulator.

* * * * *